United States Patent
Hoshi (10) Patent No.: US 7,379,111 B2
(45) Date of Patent: May 27, 2008

(54) IMAGING APPARATUS DISPLAYING IMAGES IN RECORDING AND STANDBY MODES WITH DIFFERENT LUMINANCES

(75) Inventor: Hidenori Hoshi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 618 days.

(21) Appl. No.: 10/990,501

(22) Filed: Nov. 18, 2004

(65) Prior Publication Data
US 2005/0122415 A1 Jun. 9, 2005

(30) Foreign Application Priority Data
Dec. 5, 2003 (JP) ............... 2003-407102

(51) Int. Cl.
*H04N 5/222* (2006.01)
(52) U.S. Cl. ............... 348/333.01; 348/333.04; 348/234; 345/690
(58) Field of Classification Search .......... 348/333.01, 348/333.02, 333.04, 208.15, 234, 211.13; 386/4; 345/690
See application file for complete search history.

(56) References Cited

U.S. PATENT DOCUMENTS

| | | | |
|---|---|---|---|
| 5,499,104 A | 3/1996 | Hoshi et al. | |
| 6,442,348 B1 * | 8/2002 | Yamada | 396/281 |
| 6,516,154 B1 * | 2/2003 | Parulski et al. | 396/287 |
| 6,556,240 B2 * | 4/2003 | Oka et al. | 348/211.99 |
| 6,577,821 B2 * | 6/2003 | Malloy Desormeaux | 396/374 |
| 6,741,789 B1 | 5/2004 | Hoshi | |
| 2002/0093583 A1 * | 7/2002 | Ito | 348/373 |
| 2004/0042791 A1 * | 3/2004 | Suekane et al. | 396/661 |
| 2004/0204083 A1 * | 10/2004 | Watanbe et al. | 455/557 |

FOREIGN PATENT DOCUMENTS

JP     7-193771     7/1995

* cited by examiner

*Primary Examiner*—David Ometz
*Assistant Examiner*—Usman Khan
(74) *Attorney, Agent, or Firm*—Fitzpatrick, Cella, Harper & Scinto (57) ABSTRACT

An imaging apparatus comprises an image pickup unit, a recording unit for recording image data obtained by the image pickup unit on recording unit, a display unit for displaying images relating to the image data obtained by the image pickup unit, and a control unit for making different the luminance of images to be displayed on the display unit in standby mode during which the recording of image data by recording unit is stopped, from the luminance in recording mode during which the image data are being recorded by the recording unit.

7 Claims, 7 Drawing Sheets

IMAGING APPARATUS DISPLAYING IMAGES IN RECORDING AND STANDBY MODES WITH DIFFERENT LUMINANCES

BACKGROUND OF THE INVENTION

1. Field of the Invention

The present invention relates to an imaging apparatus, and more particularly to display control in standby mode.

2. Description of the Related Art

Figure 2:
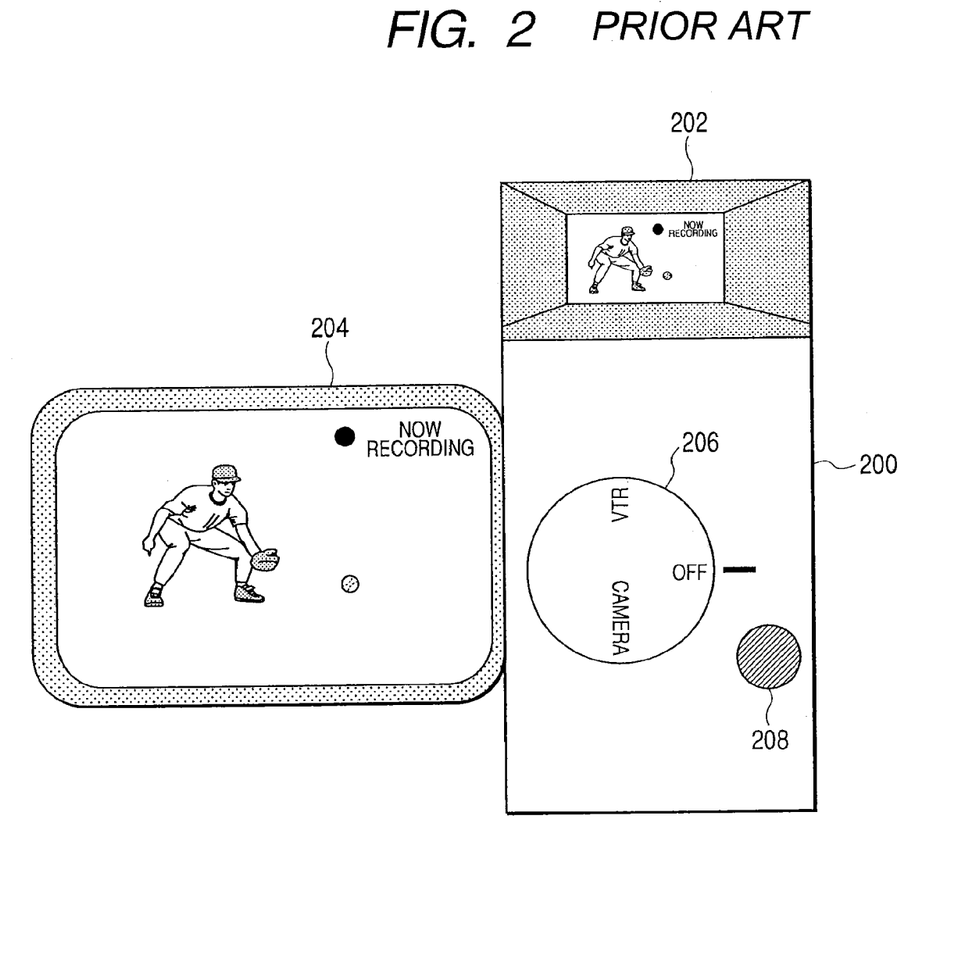
FIG. 2 is a prior art view illustrating appearance of the DVC main body and a display apparatus in recording mode.

Heretofore, video camera devices using a recording medium such as a magnetic tape, optical disk or the like have become popular and achieved widespread use. In such video camera devices, as shown in FIG. 2, in general, a video camera body 200 is equipped with a finder 202 or a liquid crystal panel 204 for displaying input images or indicating modes of the video camera. Reference numeral 206 denotes a mode change-over switch, and 208 indicates a toggle switch for switching start and pause of recording in camera mode. In such a video camera in many cases, in the camera mode at the time when an electric-power source is turned on, three modes, that is, "stop", "standby" and "recording" modes may take place by operating the mode change-over switch 206 and the toggle switch 208. The "stop" mode is the state that the electric-power source of the video camera body is off, and all the operations except for that of the power switch are not allowed.

The "standby" mode is the state that the operation of the camera is temporarily stopped by operation of the toggle switch 208 upon setting the mode change-over switch 206 to "camera". In the standby mode, no actual recording is effected although it is possible to display input images from the camera on the liquid crystal panel 204 or the finder 202 and the recoding medium is in a writable state.

The "recording" mode is the state that video data are actually being recorded on the recording medium. This state is realized by depressing the toggle switch 208 upon setting the mode change-over switch 206 to "camera".

The information indicating current operating states of the video camera except for the "stop" mode may be displayed on a display in a manner of overlaying it on the input video images from the camera.

When the "standby" mode is changed to the "recording" mode by operating the mode change-over switch 206 and the toggle switch 208 by a user, a recording lamp may be turned on to notify the transition of the mode on the finder or liquid crystal panel, while characters "during recording" may be displayed and beep sound may be produced to notify the completion of the transition to the recording mode. These functions may be provided in many video cameras.

As disclosed in Japanese Patent Application Laid-Open No. H07-193771, in addition to the above functions, there is provided a function of turning a display screen into monochrome display when in standby mode, thereby enabling a user to easily recognize the current mode.

However, it would be generally difficult for users, particularly beginners to distinguish between the standby and recording modes only by the conventional indications and the audible notification in the standby mode described above, so that they would be likely to forget the transition to the recording mode, resulting in failure to record images in many cases.

There are many concrete cases that users can not recognize the mode indication on a display unit because their attention would be absorbed in input video images themselves when they are in a state of tension.

In the function of notifying the transition from the standby mode to the recording mode by the beep sound, the beep sound is generated only when the mode transition occurs, so that a user can not know a situation that the video camera is left in standby mode.

In the case of using the monochrome display in the standby mode, moreover, in a situation of awaiting a recording chance, while watching a moving object in crowds, for example, in an athletic meeting or the like, the visibility would be remarkably lowered, then resulting in frequent failures to record images.

SUMMARY OF THE INVENTION

It is an object of the invention to solve the problems of the prior art described above.

It is another object of the invention to make possible to recognize standby mode without degrading visibility.

In order to achieve such objects, the present invention provides as one aspect thereof an imaging apparatus comprising image pickup means; recording means for recording image data obtained by the image pickup means on recording medium; display means for displaying images relating to the image data obtained by the image pickup means; and control means for making different the luminance of images to be displayed on the display means in standby mode during which the recording of image data by recording means is stopped, from the luminance in recording mode during which the image data are being recorded by the recording means.

Other objects and features of the invention will become apparent from the following detailed explanations referring to the accompanying drawings.

DESCRIPTION OF PREFERRED EMBODIMENTS

First Embodiment

Figure 1:
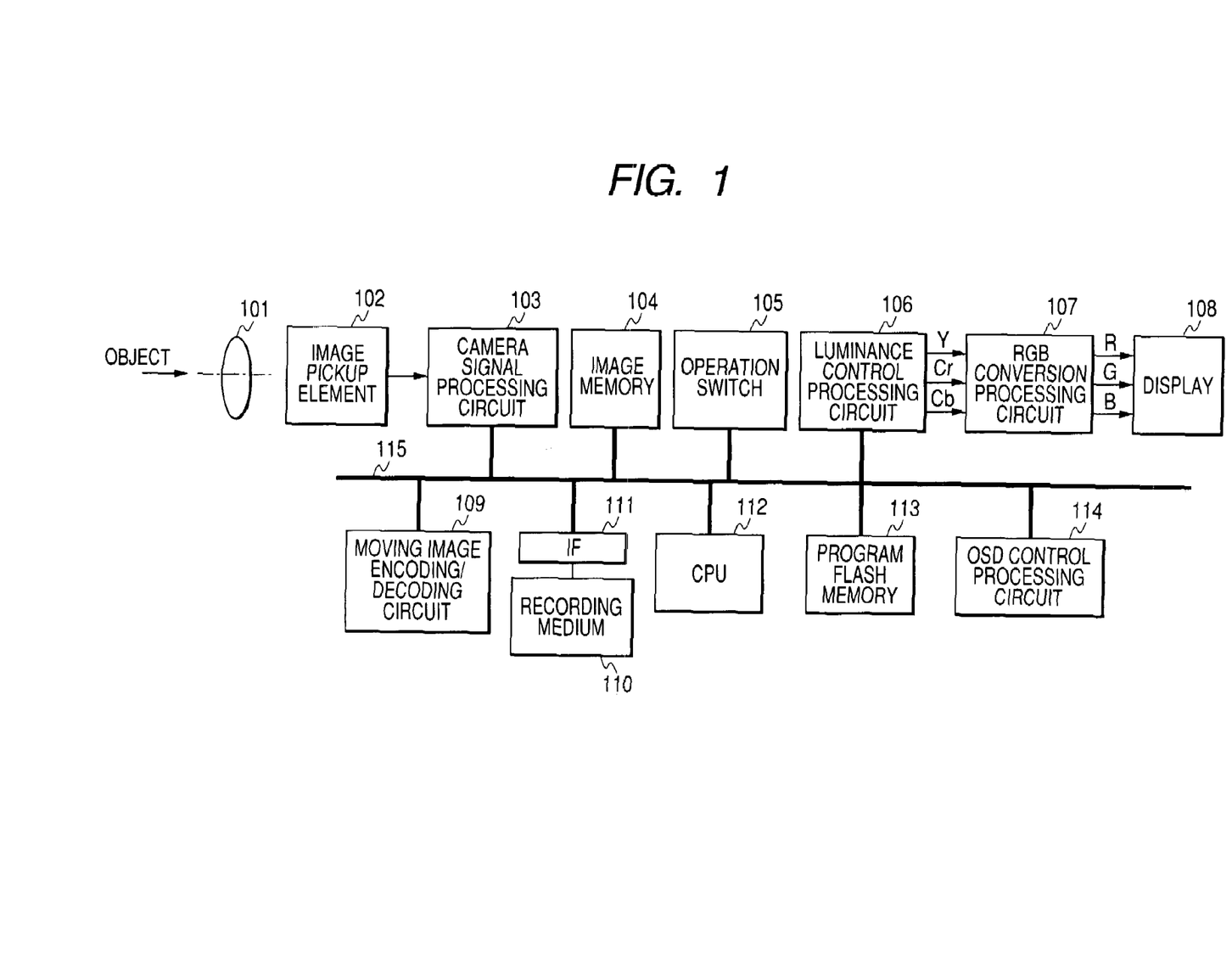
FIG. 1 is a view illustrating the constitution of the video camera as one embodiment of the invention.

FIG. 1 is a view illustrating the constitution of a video camera device (referred to hereinafter as "DVC") according to one embodiment of the invention. Some programs which are made as ROM are stored in CPU 112, and remaining programs which may be problematic as to their capacity and probable to be altered are stored in a program flash memory 113. On starting the DVC or during its normal operation, the CPU 112 operates while suitably loading these programs from the program flash memory 113, thereby performing various kinds of control operations as explained below through CPU buses 115.

When recording, an object is focused as an image formation onto an image pickup element 102 through a lens 101. After the image of the object formed on the image pickup element 102 has been photoelectrically converted, the converted image is read out at a predetermined period, and is subjected to signal processing in a camera signal processing circuit 103 so as to become standard image signals. The standard image signals output from the camera signal processing circuit 103 are temporarily stored in an image memory 104 and then output to a luminance control processing circuit 106. The luminance control processing circuit 106 controls the level of luminance signals (Y) among the input image signals in a manner described later and outputs them together with color-difference signals (Cr, Cb) to an RGB conversion processing circuit 107 as an output for display. In the RGB conversion processing circuit 107, the respective image signals Y, Cr and Cb from the luminance control processing circuit 106 are subjected to matrix processing to produce respective color signals of R, G and B which are output to a display 108, thereby displaying moving images now being recorded on the display 108.

A photographing button included in an operation switch 105 is depressed to start the photographing. This button corresponds to a toggle switch 208 in FIG. 2. When the photographing is started, the moving image data temporarily stored in the image memory 104 are compression-encoded in a moving image encoding/decoding circuit 109 and written back to the image memory 104. After the moving image data are once stored in the image memory 104 as a buffer memory, they are stored through an interface 111 on a recording medium 110 such as a hard disk, magnetic tape, semiconductor memory or the like.

An OSD control processing circuit 114 serves to cause mainly text images such as menu display, mode information and the like to overlay on display images being recorded. Specifically, OSD data written to the image memory 104 from the CPU 112 are read out by the OSD control processing circuit 114 and overlaid onto the moving image data, which are then output to the luminance control processing circuit 106.

Figure 3:
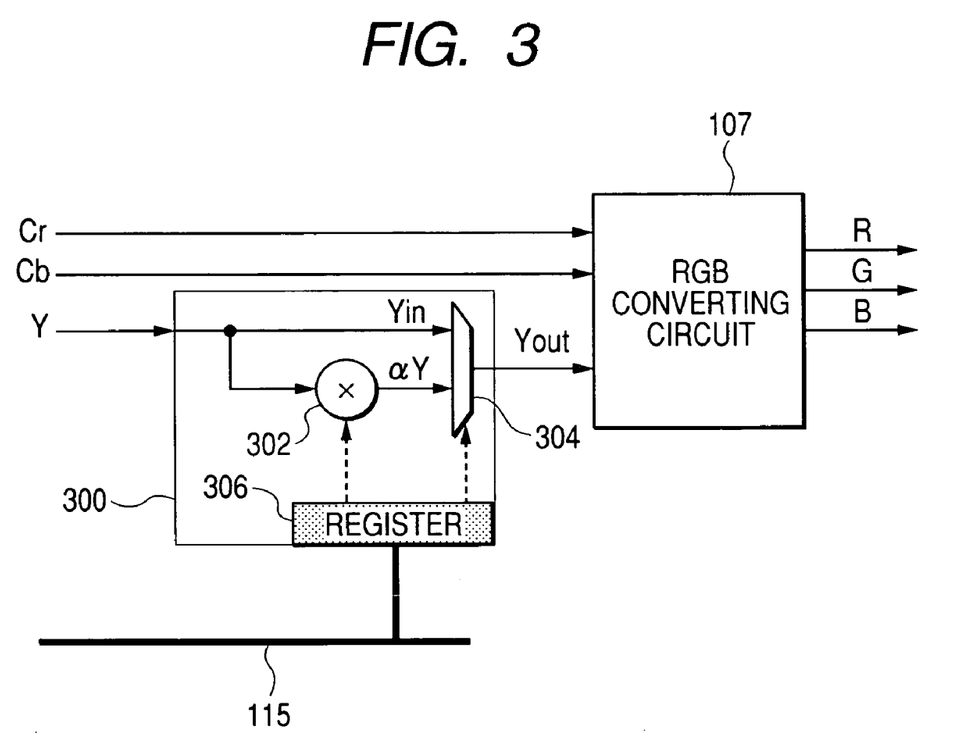
FIG. 3 is a block diagram illustrating a luminance control processing circuit in the embodiment of the invention.

The luminance control processing circuit 106 will be explained in detail with reference to FIG. 3.

The Y components of the image data read out from the image memory 104 are input to a luminance control processing circuit 300 and other components Cr and Cb are directly supplied to the R/G/B conversion processing circuit 107. The CPU bus 115 is connected to the luminance control processing circuit 300 equipped with a group of registers 306 for setting factor values for controlling the luminance level, setting the period for controlling the luminance level, or setting the level of ambient brightness.

The CPU 112 sets desired values to the registers 306 and further can set, in addition to default values, menus caused by operation of the operation switch 105 in FIG. 1 by a user, factor values (referred to hereafter as "α") for controlling arbitrary luminance levels and period(referred to hereafter as "Y_Freq") for controlling the luminance levels. Concerning the level of brightness, the CPU 112 reads out at a certain period the Y components stored in the image memory 104 so that the level of brightness is set to the group of registers 306 in accordance with decision of the level of the Y component. A reference numeral 302 denotes a multiplier which multiplies a Y input signal (referred to hereinafter as "Yin") which has been input to the luminance control processing circuit 300 by α which has been set by the CPU 112, to output as αY which is then supplied to a selector 304.

In this case, the value of α is a floating point number such as 1.5 or 0.5. The value of α is set by the CPU 112 to the group of registers 306 and determined in accordance with the information of ambient brightness under where the video recording is now to be carried out.

Figure 4:
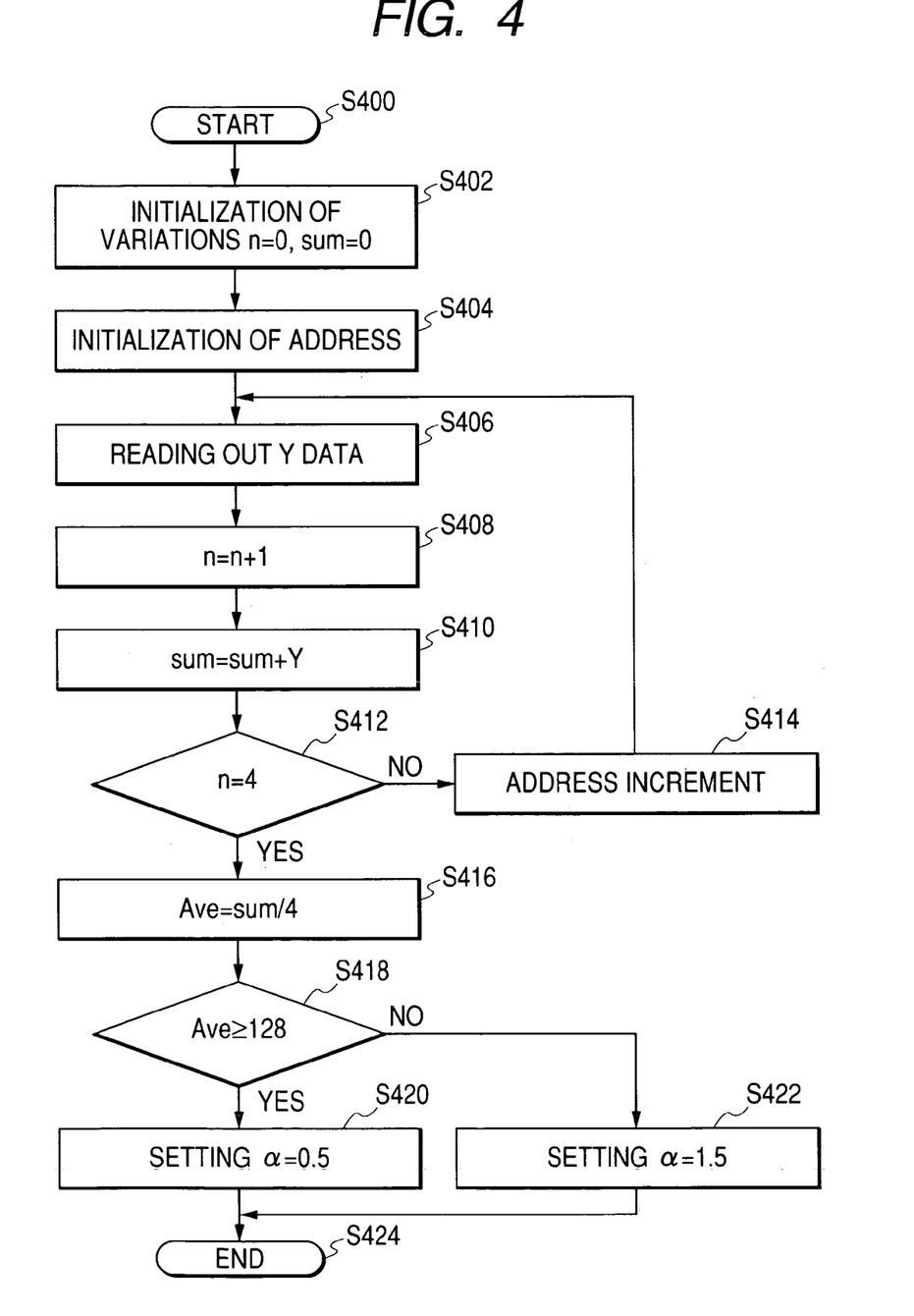
FIG. 4 is a flow chart illustrating luminance control processing operations of the embodiment of the invention.

The processing by the CPU 112 for determining the value α will be explained with reference to the flow chart in FIG. 4.

The flow chart is started at S400. Variations are initialized at S402. In this step, the number (n) of times of reading of the Y data is set to zero, and the additional value (sum) of values of the Y which are read out is also set to zero. Addresses for reading out the Y data are initialized at S404. The Y data are read out from the image memory 104 at S406. Thereafter, an increment of n is performed at 408, and a value Y which is read out is added to the value (sum) at S410. If n is not 4 at S412, an address increment is performed at S414 to set an address for next reading out the Y data, and the same steps from S406 are repeated. When the (n) becomes equal to 4 at S412, the value (sum) is divided by 4 at S416 to obtain a mean value (Ave) of Y. If the mean value (Ave) of Y is equal to or more than 128 at S418, the value (α) is set to 0.5 at S420. If the mean value (Ave) is less than 128 at S418, the value (α) is set to 1.5 at S422. The setting processing of α is completed at S424 in this manner.

In other words, the imaging apparatus according to the embodiment operates in a manner that in a standby mode in a comparatively bright situation, the luminance level is set to a half value, while in a standby mode in a comparatively dark situation, the luminance level is set to 1.5 times. As a result of the operation of the apparatus, αY obtained by multiplying the input Yin by the above factor α is output from the multiplier 302. The above processing in the embodiment of the invention is carried out with respect to each frame.

As a matter of course, even if the value of α is other than those described above or the processing is effected with respect to a plurality of frames, the same effects can be obtained without any problems.

The operation of the selector 304 will be explained in detail. The Yin and αY signals are supplied to the selector 304. The selector 304 selects the Yin and αY depending upon the Y_Freq set by the CPU 112 to the register, so that the selected signals are supplied as Yout to the R/G/B conversion processing circuit 107.

In this case, the mode signal indicating whether the mode is recording or standby is set to the registers by the CPU 112. In recording, the selector 304 always selects the Yin to supply it to the Yout.

On the other hand, if in the standby mode, the following operations are performed.

For example, in the case of Y_Freq=0, only the Yin is always selected to be output as the Yout. In the case of Y_Freq=1, the Yin and αY are alternately output as Yout for each frame. Similarly, in the case of Y Freq=2, the Yin and αY are alternately output as Yout for every two frames.

Assuming that the Y_Freq setting register is 5 bits, the same operations as described above are performed during the set value of Y_Freq is equal to or less than 30, and in the case that Y_Freq is set to 31, αY only is always output as Yout.

Figure 5:
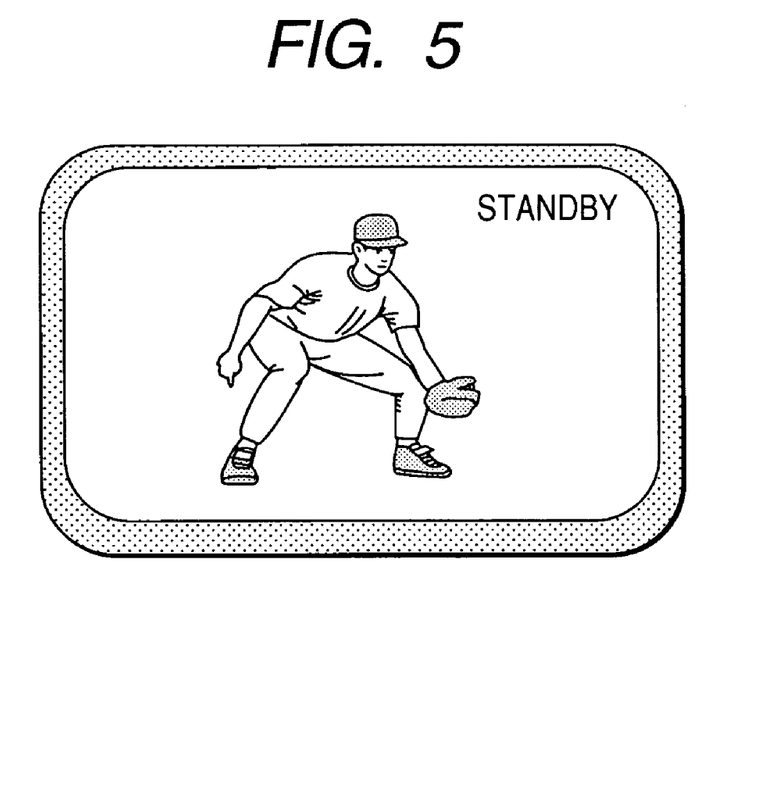
FIG. 5 is a view illustrating the displaying state in standby mode.
Figure 6:
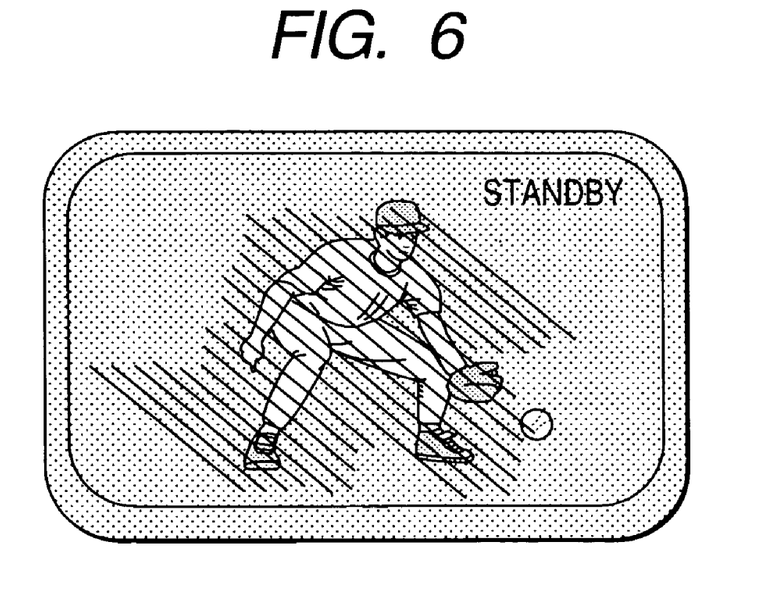
FIG. 6 is a view illustrating the displaying state in standby mode of the embodiment of the invention.

FIG. 5 illustrates a displaying condition of standby mode of the prior art in a bright place. In contrast herewith, FIG. 6 illustrates displaying condition of standby mode when α is set to 0.5. These displaying conditions in FIGS. 5 and 6 are alternately produced at a period depending on set values of the Y_Freq.

In this embodiment, when under a standby mode condition, the brightness of images displayed on the display 108 is varied at a certain period in this manner to notify the fact that the apparatus is now under the standby mode condition, thereby enabling a user to easily recognize it without detracting from the visibility of the images.

Second Embodiment

The second embodiment of the invention will be explained with reference to FIGS. 7 and 8.

Figure 7:
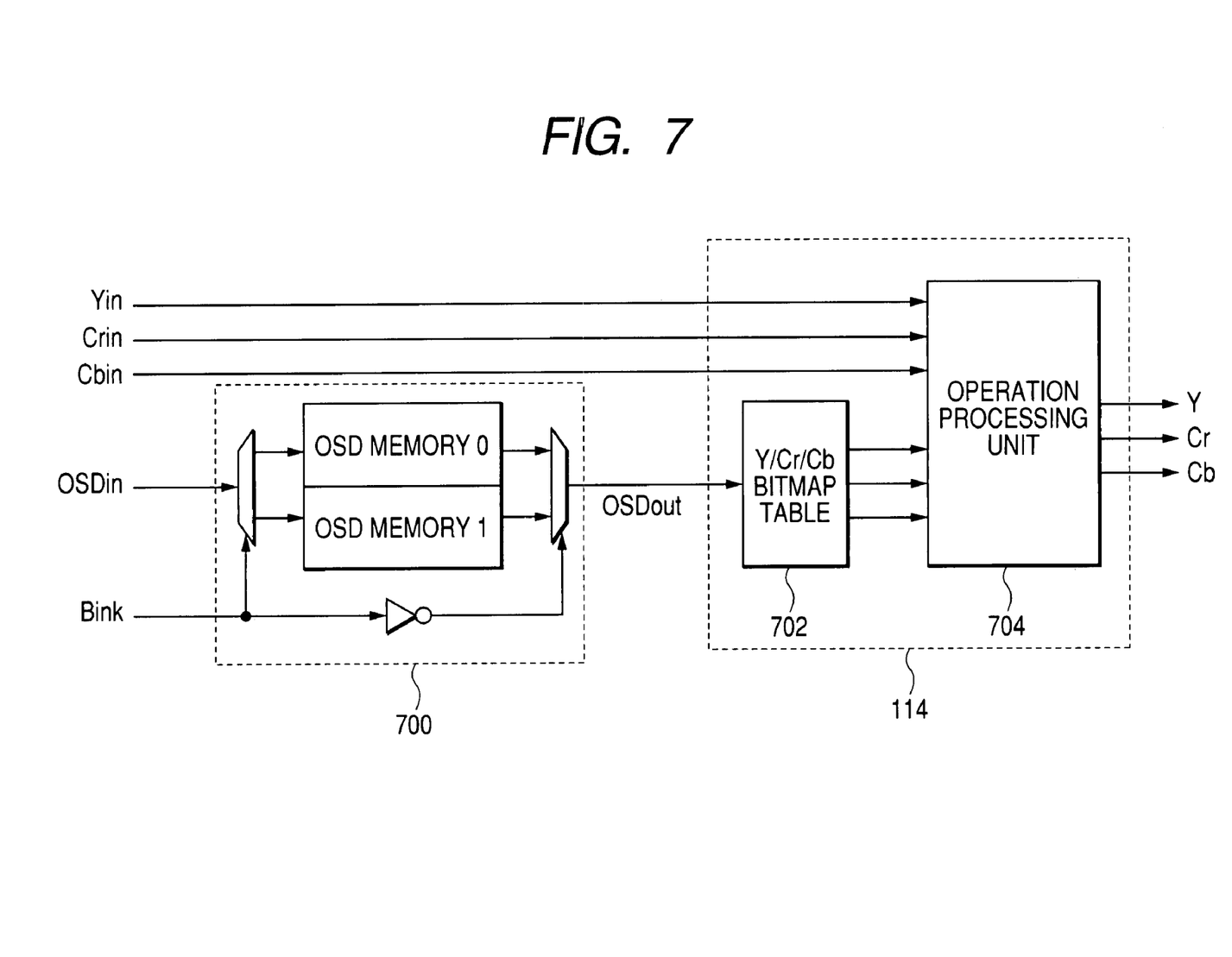
FIG. 7 is a block diagram illustrating the constitution of the OSD overlay processing unit according to the second embodiment of the invention.
Figure 8:
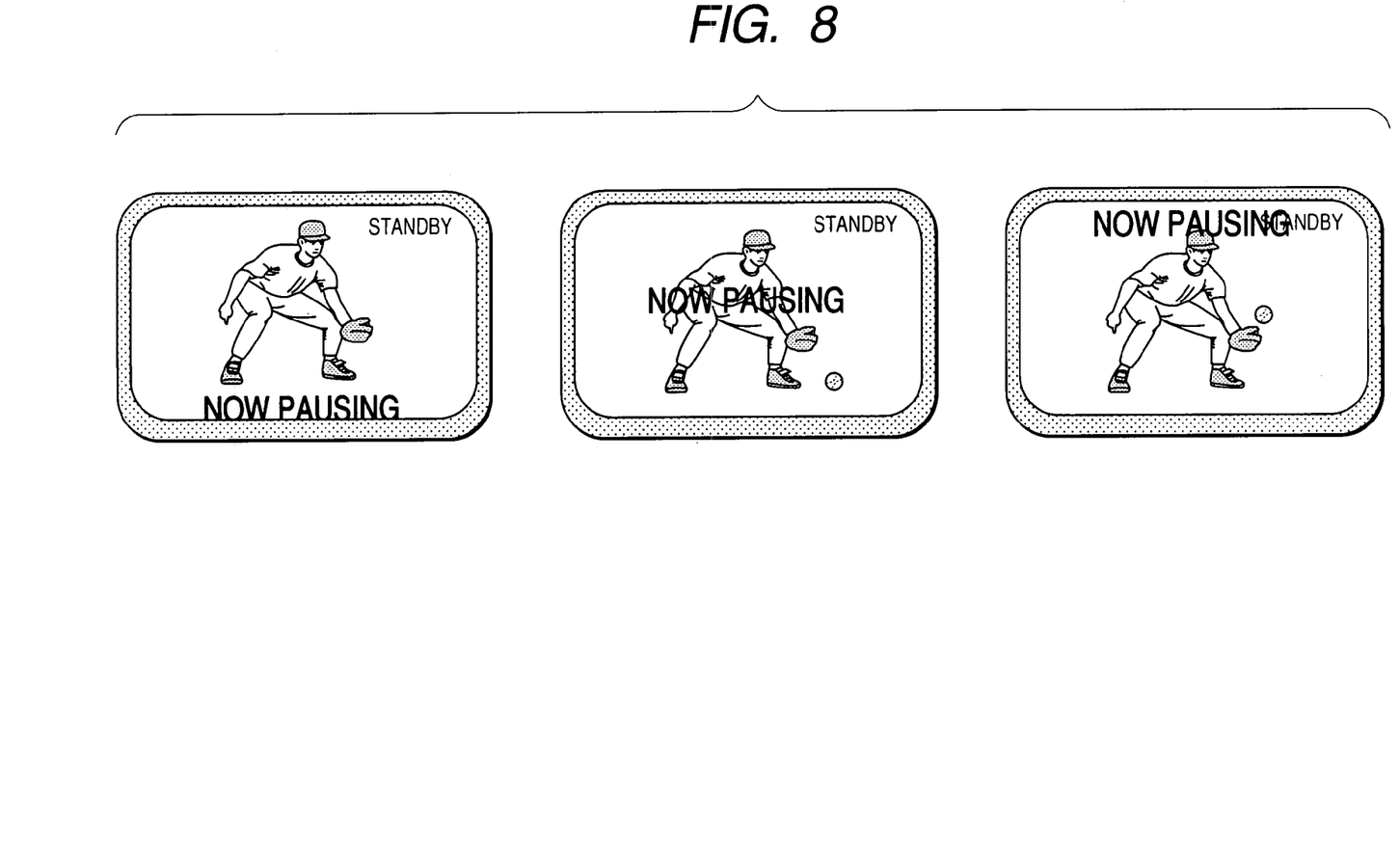
FIG. 8 is a view illustrating a displaying state in standby mode of the second embodiment of the invention.

FIG. 7 is a block diagram illustrating in detail the OSD control processing circuit 114 shown in FIG. 1. Reference numeral 700 indicates the processing state of writing and reading OSD data into and from the OSD data storing region provided in the image memory 104. The CPU 112 writes OSD data into, for example, an OSD memory 0 in synchronism with the frame period, while OSD control processing circuit 14 reads out the OSD data from the OSD memory 1 as OSDout signals. In this case, a control is effected by the CPU 112 so as not to cause writing and reading regions of the OSD memory 0 and OSD memory 1 to overlap to each other. A Y/Cr/Cb bit map table 702 refers to predetermined tables on the basis of values of input OSDout to supply respective values of Y/Cr/Cb to an operation processing unit 704.

The operation processing unit 704 is also supplied with the Y/Cr/Cb of moving image data read out from the memory 104 to sum up these moving image data and the bit map data of OSD, these summed data being supplied to the luminance control processing circuit 106. By overlaying the OSD data onto the moving image data in this manner, the character information as shown in FIG. 8 is displayed while being scrolling in a vertical direction.

In this case, depending on the constitution of the Y/Cr/Cb bit map table 702, font, size and color of the displayed characters can be changed by setting menus by a user in any desired manner.

Moreover, values which the CPU writes into the OSD memory can be controlled in conjunction with the information of ambient brightness described above, that is, the values of the Ave. For example, when the Ave is more than 128 and an environment is judged to be bright, values are written into the bit map table 702 so that the displayed characters become dark color. On the other hand, when the Ave is less than 128 and an environment is judged to be dark, values are written into the bit map table 702 so that the displayed characters become bright color.

Further, scrolling means for character information and control of displayed characters depending upon environment of image recording are not limited to those in the embodiments and are easily modified and changed in various manners with the same effects.

It is also possible to scroll displayed characters to provide the multiple or overlaying display as explained in the second embodiment, while changing the luminance on the display screen of the display under the standby mode condition as explained in the first embodiment.

The scope of the present invention includes such apparatuses or systems connected to various devices to be operated to realize the functions in the above embodiments, computers of which apparatuses or systems are supplied with program codes of software for realizing the functions of the embodiments described above so that the devices are operated in accordance with the programs stored in the computers (CPU, or MPU) of the systems or apparatuses to realize the functions.

In this case, moreover, the program codes themselves of the software will realize the functions of the embodiments described above, and the program codes themselves and means for supplying the program codes to the computers, for example, recording media storing such program codes will constitute the present invention.

As the recording media storing such program codes, various recording media can be used such as, for example, a floppy disk, hard disk, optical disk, magnetic optical disk., CD-ROM, magnetic tape, nonvolatile memory card, ROM and the like.

It goes without saying that in addition to the realization of the functions of the above embodiments, in the case that the functions of the above embodiments are realized by the program codes in cooperation with OS (operating system) operating in the computer or other application soft or the like, such program codes are also included in one embodiment of the invention.

Further, it goes without saying that in the case that after supplied program codes are stored in a memory provided in an extension board of a computer or in an extension unit connected to the computer, CPU or the like provided in the extension board or in the extension unit performs part or all of the actual processing in accordance with the indication of the program codes, by means of which processing the functions in the embodiment described above are realized, such program codes are also included in the present invention.

It is to be understood that the present invention is not limited to the embodiments described above and various modification and variations are possible within the scope of the invention defined in the appended claims.

This application claims priority from Japanese Patent Application No. 2003-407102 filed Dec. 5, 2003, which is hereby incorporated by reference herein.

What is claimed is:

1. An imaging apparatus comprising:
   image pickup means;
   recording means for recording image data obtained by the image pickup means on a recording medium;
   display means for displaying images relating to the image data obtained by the image pickup means;
   adjustment means for adjusting luminance of the image data obtained by the image pickup means, by using a coefficient and for causing the display means to display the image data the luminance of which is thus adjusted; and
   control means for controlling the adjustment means so that in a recording mode during which the image data are being recorded by the recording means, the adjustment means does not adjust the luminance of the image data obtained by the image pickup means, by using the coefficient, and in a standby mode during which the recording of the image data by the recording means is stopped, the adjustment means sets the coefficient to a first value if the luminance level of the image data obtained by the image pickup means is greater than a predetermined value, sets the coefficient to a second value which is greater than the first value, if the luminance level of the image data obtained by the image pickup means is less than the predetermined value, and further causes the display means to periodically display the image data the luminance of which is adjusted by using the coefficient, and the image data the luminance of which is not adjusted by using the coefficient.

2. The apparatus according to claim 1, further comprising altering means for altering of a variation period and in any desired manner.

3. The imaging apparatus according to claim 1, wherein:
the control means causes the display means to display a character string for indicating that a state is in a standby state on the display means by overlaying the character string on the images, while scrolling the character string, in the standby mode during which the recording of image data by the recording means is stopped.

4. The apparatus according to claim 3, wherein the control means varies at least one of a scroll operation, a font, a size and a color of the character string depending on an environment of image recording.

5. The imaging apparatus according to claim 1,:
the control means varies periodically the luminance of images to be displayed on the display means in the standby mode.

6. A control method of an imaging apparatus including image pickup means, recording means for recording image data obtained by the image pickup means on a recording medium, and display means for displaying images relating to the image data obtained by the image pickup means, comprising the steps of:
adjusting luminance of the image data obtained by the image pickup means, by using a coefficient and causing the display means to display the image data the luminance of which is thus adjusted; and effecting control so that in a recording mode during which the image data are being recorded by the recording means, the adjusting step does not adjust the luminance of the image data obtained by the image pickup means, by using the coefficient, and in a standby mode during which the recording of the image data by the recording means is topped, the adjusting step sets the coefficient to a first value if the luminance level of the image data obtained by the image pickup means is greater than a predetermined value, sets the coefficient to a second value which is greater than the first value, if the luminance level of the image data obtained by the image pickup means is less than the predetermined value, and further causes the display means to periodically display the image data the luminance of which is adjusted by using the coefficient, and the image data the luminance of which is not adjusted by using the coefficient.

7. A computer-readable storage medium storing a computer program comprising a program code for causing a computer to execute the control method according to claim 6.

* * * * *